Nov. 5, 1957 J. BACK 2,811,816
TIRE AND METAL BUFFING TOOL
Filed Oct. 4, 1955
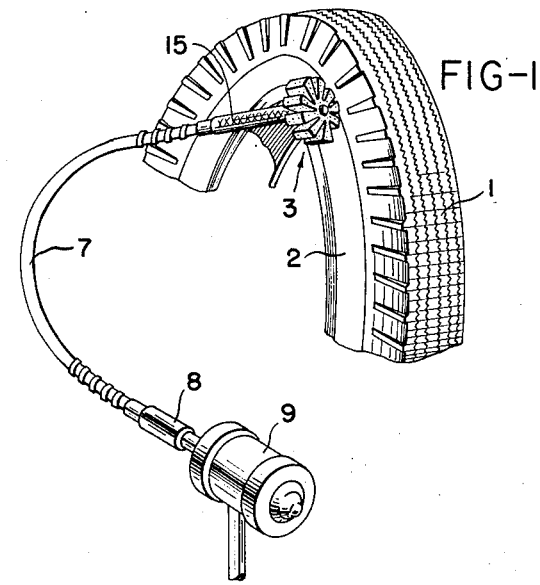
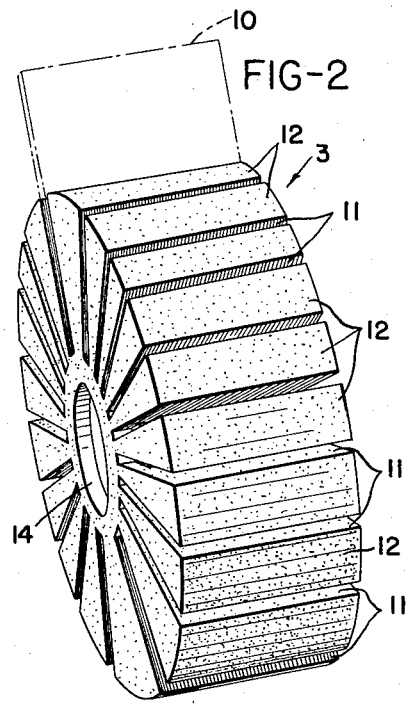
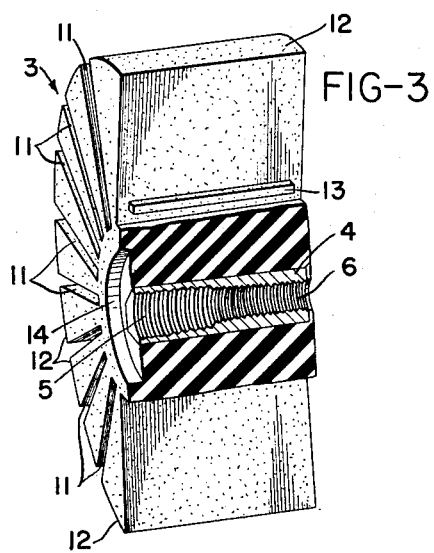
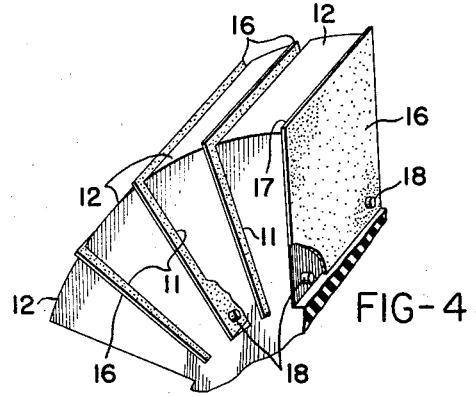
INVENTOR.
JAMES BACK
BY Toulmin & Toulmin
ATTORNEYS United States Patent Office 2,811,816
Patented Nov. 5, 1957

2,811,816

TIRE AND METAL BUFFING TOOL

James Back, Dayton, Ohio

Application October 4, 1955, Serial No. 538,353

7 Claims. (Cl. 51—193.5)

The present invention relates to a scuffing or buffing tool that can be used for abrading rubber, metal or wooden surfaces. It finds considerable application in removing the film or foreign matter which usually collects on white side wall tires after the latter have been re-capped. When certain modifications are made in the construction of the device, the latter can be used for cleansing or polishing metal parts and, if desired, for cutting or otherwise abrading wooden parts. The improved scuffing or cleansing device is of the type in which the moving element is rotative on an axis substantially parallel to the surface being treated.

The primary object of the invention is to provide a rotary scuffing or polishing tool, operable by a flexible shaft and having a resilient abrading action on the surface being treated.

Another object is to provide a rotary scuffing device of a flexible and resilient character which can be applied to the surfaces of tires in order to remove scum and restore the side walls to their original white color.

Still another object is to provide a rotary cleaning or buffing device which, while having a resilient abrading surface for treating rubber, can readily be modified to present a harder abrading surface for working on metal or wood.

Another object is to provide a rotary cleaning tool formed of sections of resilient material, the sections being yieldably positioned with respect to one another to give a scuffing effect at the surface being cleaned.

A further object is to provide a rotary cleaner formed of sections of resilient material spaced from one another in the peripheral direction to cause a driving effect of the sections on the surface being cleaned or buffed.

A still further object is to provide a rotary abrading device constituted of spaced segments of resilient material, each segment being provided with abrasive material which contacts at its outer edge the surface to be abraded.

A still further object, and as a modified structure, is to provide a rotary scuffing or buffing tool made of a moldable material such as rubber, and formed of spaced segments together with emery paper attached to the segments and extending outwardly slightly beyond the segments in order that when the device is being rotated, the emery paper extensions serve successively to abrade the metal workpiece.

These objects are carried out in brief, by molding the scuffing or buffing tool out of melted rubber in a die, while adding tropical nut shells, ground up, into the liquid mass and forming slots between the segments of the device by means of inserted metal plates extending radially outward from the center of the device. The mass is vulcanized or cured and allowed to solidify, after which the radially extending plates are removed to leave slots of uniform thickness extending from the center portion of the device to the peripheral surface, and also extending the entire width of the device.

The latter is then mounted on a shaft through a hub and, upon being rotated, the ground up nut shells serve as cutting edges and the space between the segments give a desirable dragging or resilient effect to the cutting or abrading operation.

Other objects and features will be apparent as the specification is perused in connection with the accompanying drawings, in which:

Figure 1 is a perspective view of the scuffing or buffing device in operation, and shown in connection with a white walled tire;

Figure 2 shows the improved device in perspective;

Figure 3 is a view of the device broken away diametrally and showing the axial support in section; and Figure 4 represents a fragmentary view of a modified form of the device and adapted more especially to abrading metal parts.

Referring to Figure 1, reference character 1 designates a tire which has been re-capped (not shown) and which, it is assumed, contains thereon a layer of thin re-capping rubber or other foreign material which may be spread over the white wall indicated at 2. It is therefore desirable that this material be removed in order to restore the wall to its original whiteness, but without any cutting effect or other injury to the tire itself.

For this purpose, and in accordance with my invention, there is provided an improved scuffing or buffing tool or device, the details of which are shown more particularly in Figures 2 and 3. As illustrated, the tool comprises a circular structure of rubber, designated by general reference character 3, molded and cured in the usual manner, and which is supported on a centrally located metal tube 4 (Fig. 3). The tube 4 is constituted of any suitable metal, such as brass, and passing therethrough there is a bore of two different diameters, as shown at 5 and 6 respectively. Both ends of the bore are threaded, but to different sizes, so as to receive the screwed end of a flexible shaft 7 which may be coupled, as indicated at 8, to an electric motor 9.

Thus, the tube 4 is adapted to receive shafts of different threaded diameters, and the smaller diameter shaft can be passed freely through the larger threaded opening. This tube is molded into the rubber tool and, due to its hexagon shape, the tube cannot turn with respect to its rubber matrix.

When the tool is being formed, melted natural rubber is poured into a die or mold of the requisite shape, there being arranged in a radial array a number of metal plates, one of which has been indicated at 10 as being in the process of being removed (Fig. 2). The purpose of these plates is to leave spaces, indicated at 11, of the thickness and width of the plates between the rubber segments, indicated at 12, so that the spaces have parallel sides and the segments are of wedge shape.

These plates have a slot (not shown) near the lower edges for receiving the melted rubber so that when the plate is removed after the rubber has solidified there is left a web 13 between the segments at the lower ends, the purpose of which is to serve as a spacer between the lower or innermost portions of the segments and thus prevent the latter from being pressed together when the tool is being rotated during the abrading operation.

The web or rib is indicated at 13 in Fig. 3 and it will be noted that the web does not extend the full length of each segment, for otherwise the plate having the slot therein by which the web is formed would not be of a unitary character. Due to the resilience of the material (rubber), it is not difficult to press the plate into the body of the adjacent segment and thus move the plate clear of the web preparatory to removing the plate in the manner shown in Fig. 2.

It will be understood that the tube 4 is placed in position within the mold before the pouring of the rubber is started and there may also be provided an insert (not shown) in the mold by which the recess 14 is formed. This recess forms a clearance space for the tubular handle 15 which surrounds the shaft 7 and which is gripped by the operator in moving the rubber tool from one place to another along the side wall of the tire.

The ground-up tropical nut shells are sprinkled throughout the liquid rubbery mass in order to form, when the device has cooled and solidified, roughened areas which extend over every exposed surface of the tool, including the parallel surfaces of the spaces or slots 11 left by the plates which are equidistantly arranged in a radial direction within the mold.

The web 13 serves not only as a spacing element at the bottom of the wedge-like segments 12, but in addition, serves to strengthen the element at this position by adding body thereto. Thus, as the end of the shaft 7 is threaded into the opening 5 or 6 of the tube or hub 4 and the electric motor 9 started, the tool 3 will rotate at a fast speed so that when the periphery of the tool is presented to a surface to be cleaned or scuffed, such as the white side walls of a tire, the grime or thin pieces of rubber that may have formed during a re-capping job, are immediately abraded or scuffed off, leaving the walls in their original whitened condition. The segments tend to contact one another at the periphery where the scuffing or abrading action has taken place and this tendency to press together constitutes a dragging or delayed action which provides a gentle abrading effect so that the tire can in no way be damaged, even when considerable pressure is applied to the tool.

The particles of ground up nut shells that project slightly out of the surface of the rubber serve as miniature scraping fingers and the fact that they extend outwardly only a very short distance assures the rubber surface of the tire from being subjected to an undesirable cutting or scraping action.

It is evident that the tool can be continuously used for this abrading or scuffing effect as long as any depth of the segments remain, because as the latter wear down in depth, the abrading effect of the surface renews itself on account of the slightly protruding nut shells, because the latter extend through the entire body of the rubber. Thus, the improved scuffing device has a relatively long life.

In order to adapt the device to conditions under which metal parts may be scuffed or polished, it may be desirable to provide at a surface of each segment at the slot 11, a small piece of emery cloth indicated at 16, this piece having a length approximately the same as the width of the tool but a length measured radially somewhat longer than the length of each segment to leave a small overhang, indicated at 17. This emery paper lays with its smooth side against the surface of each segment as indicated in Figure 4, and is held in position by means of a pair of rubber locating pins 18 which are molded in each segment. These pins take the place of the web or rib 13 described in connection with Figure 3.

It is apparent that the plate 10, instead of being provided with a slot at the bottom by which the web 13 is produced, can now be provided with a pair of spaced apertures into which the rubber will flow and, here, again, the plate can be readily removed to leave the pins 18 in place by simply pressing the plate into the adjacent body of rubber after the latter has solidified.

When the tool shown in Figure 3 is rotated on a tube or hub 4, the overhanging edges along the periphery of the segments produce a scraping or polishing action on the metal surface and, as in the case of the article previously described, the segments bunch up together at the point of contact with the workpiece to provide a delaying or cushioning effect and thus a gentle abrading or polishing action.

It is further evident that as the segments 12 continue to wear down in the radial direction, the outermost edge of each piece of emery paper will expose a new surface so that the emery paper is fully effective even after long and hard usage of the abrading tool. It will be understood that in addition to the abrading effect of the emery paper, as explained above, the ground-up nut shells which project slightly above the working surface of the tool also add their abrading or polishing effect to that furnished by the emery paper or cloth.

Instead of polishing metal, it may be desirable to abrade wood parts or surfaces, in which case sandpaper may be substituted for the emery paper or cloth 16.

From the foregoing, it is evident that I have disclosed a scuffing or buffing tool or device constituted of a resilient material such as rubber molded to shape and cured, with radially extending wedge shaped segments having roughened surfaces produced by the addition of ground-up tropical nut shells. The gentle action of these segments in crowding against one another at the region of abrasion and the myriads of nut shell particles produce a very sensitive buffing effect which is peculiarly adapted to the soft walls of a white side wall tire. The tool can be readily modified in construction to polishing metal or abrading wood, either with or without the addition of emery cloth and sandpaper sheets placed between the segments and located by molded supports.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters Patent, is:

1. A rotary device for cleaning a soiled object, said device comprising a tubular hub having an opening for receiving a driving shaft, segmental portions of rubber extending outwardly from said hub, said portions being equidistantly spaced from one another by projections formed integral with the segmental portions and extending from each of the portions and abutting the surface of the adjacent portion.

2. A rotary device for cleaning a soiled object, said device comprising a tubular hub having an opening for receiving a driving shaft, segmental portions of rubber extending outwardly from said hub, said portions being equidistantly spaced from one another by webs of rectangular cross-section and forming integral parts of the rubber portions, the web of one rubber portion being separate from the surface of the adjacent rubber portion but in abutting relation thereto in order to space the portions from one another.

3. A rotary device for cleaning a soiled object, said device comprising a tubular hub having an opening for receiving a driving shaft, segmental portions of rubber extending outwardly from said hub, said portions being equidistantly spaced from one another by webs of rectangular cross-section and forming integral parts of the rubber portions, the web of one rubber portion being separate from the surface of the adjacent rubber portion but in abutting relation thereto in order to space the portions from one another, said rubber portions and said webs being molded to shape and containing abrasive particles which extend beyond the surface of the rubber.

4. A rotary device for cleaning a soiled object, said device comprising a tubular hub having an axial opening of at least two different diameters, each diameter being threaded to receive threaded shafts of different size, a plurality of segmental rubber portions extending radially outward from the hub, said portions being separated from one another by slots which extend the full width of the device, said rubber being molded to shape and containing abrasive particles which project beyond the surface of the rubber, said projections being adapted to fit into openings of pieces of emery cloth when the latter are inserted within the spaces between the segmental portions, said emery cloth serving to provide additional abrasive surfaces as the device is rotated on its shaft.

5. A rotary device for cleaning a soiled object, said device comprising a tubular hub having an axial opening of at least two different diameters, each diameter being threaded to receive threaded shafts of different size, a plurality of segmental rubber portions extending radially outward from the hub, said portions being separated from one another by slots which extend the full width of the device, said rubber being molded to shape and containing abrasive particles which project beyond the surface of the rubber, said projections being adapted to fit into openings of pieces of emery cloth when the latter are inserted within the spaces between the segmental portions, said emery cloth serving to provide additional abrasive surfaces as the device is rotated on its shaft, said pieces of emery paper extending slightly beyond the periphery of the rotary device in order to accentuate the abrasive effect of the cloth and of the rotary device as a whole.

6. A rotary cleaning device comprising a circular member of resilient material and carried on a hub, open slots extending radially outward from said hub and equidistantly spaced from one another to leave segments therebetween and abrasive elements separate from the circular member positioned within said slots, said elements being in sheet form of abrasive material and having a thickness less than the width of the slots and secured to the side walls of the slots.

7. A rotary cleaning device comprising a circular member of resilient material and carried on a hub, open slots extending radially outward from said hub and equidistantly spaced from one another to leave segments therebetween, and abrasive elements separate from the circular member interposed in said slots, said elements being constituted of abrasive material in sheet form having a length comparable to the thickness of said member, and a width such as to extend beyond the circular boundary of the member, said sheets of abrasive material having a thickness less than the width of the slots and secured to the circular member at the position of the walls of the slots.

References Cited in the file of this patent

UNITED STATES PATENTS

| | | |
|---|---|---|
| 60,264 | Sawyer | Dec. 4, 1866 |
| 238,502 | Harper | Mar. 8, 1881 |
| 785,231 | Roberts et al. | Mar. 21, 1905 |
| 1,150,024 | Ford | Aug. 17, 1915 |
| 1,507,836 | King | Sept. 9, 1924 |
| 1,917,303 | Hope | July 11, 1933 |
| 2,049,874 | Sherk | Aug. 4, 1936 |
| 2,178,491 | Polotce | Oct. 31, 1939 |
| 2,257,864 | Sheehan | Oct. 7, 1941 |
| 2,332,133 | Dayton | Oct. 19, 1943 |
| 2,607,173 | Garrison | Aug. 19, 1952 |
| 2,720,064 | Klug | Oct. 11, 1955 |
| 2,755,601 | Lux | July 24, 1956 |

FOREIGN PATENTS

| | | |
|---|---|---|
| 12,802 | Great Britain | Aug. 14, 1890 |